(12) United States Patent
Padala et al.

(10) Patent No.: US 11,340,949 B2
(45) Date of Patent: May 24, 2022

(54) METHOD AND NODE FOR MANAGING A REQUEST FOR HARDWARE ACCELERATION BY MEANS OF AN ACCELERATOR DEVICE

(71) Applicant: Telefonaktiebolaget LM Ericsson (publ), Stockholm (SE)

(72) Inventors: Chakri Padala, Bangalore (IN); Mozhgan Mahloo, Solna (SE); Joao Monteiro Soares, Solna (SE); Nhi Vo, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 32 days.

(21) Appl. No.: 17/052,172

(22) PCT Filed: May 8, 2018

(86) PCT No.: PCT/SE2018/050477
§ 371 (c)(1),
(2) Date: Oct. 30, 2020

(87) PCT Pub. No.: WO2019/216797
PCT Pub. Date: Nov. 14, 2019

(65) Prior Publication Data
US 2021/0055971 A1      Feb. 25, 2021

(51) Int. Cl.
*G06F 9/50*      (2006.01)
(52) U.S. Cl.
CPC .................... *G06F 9/5044* (2013.01)
(58) Field of Classification Search
CPC ...................................................... G06F 9/5044
See application file for complete search history.

(56) References Cited

U.S. PATENT DOCUMENTS

| 8,250,578 B2 | 8/2012 | Krishnamurthy et al. |
| 2010/0058036 A1 | 3/2010 | Degenaro et al. |

(Continued)

FOREIGN PATENT DOCUMENTS

| EP | 3373517 A1 | 9/2018 |
| WO | 2010151813 A1 | 12/2010 |

(Continued)

OTHER PUBLICATIONS

Jagath Weerasinghe et al., "Disaggregated FPGAs: Network Performance Comparison against Bare-Metal Servers, Virtual Machines and Linux Containers," 2016, pp. 9-17, 2016 IEEE 8th International Conference on Cloud Computing Technology and Science, downloaded from http://ieeexplore.ieee.org/document/7830659/.

(Continued)

*Primary Examiner* — Sisley N Kim
(74) *Attorney, Agent, or Firm* — NDWE LLP

(57) ABSTRACT

A method and a hardware acceleration managing node for managing a request for hardware acceleration (HA). The hardware acceleration managing node receives, from a HA interfacing node, the request for hardware acceleration of processing of source data. The hardware acceleration managing node sends an indication of a source memory location (s) for storing of the source data. The hardware acceleration managing node selects one or more hardware acceleration devices. The hardware acceleration managing node receives a chunk of code to be accelerated. The hardware acceleration managing node sends, to the one hardware acceleration device, a set of acceleration instructions related to the chunk of code and the indication of the source memory location. The hardware acceleration managing node receives an indication of a result memory location indicating result data. The hardware acceleration managing node sends an indication of (Continued)

completed hardware acceleration to the HA interfacing node.

9 Claims, 3 Drawing Sheets

(56) References Cited

U.S. PATENT DOCUMENTS

| | | |
|---|---|---|
| 2010/0151813 A1 | 6/2010 | Faerber et al. |
| 2013/0054934 A1 | 2/2013 | Mitsugi et al. |
| 2013/0061033 A1* | 3/2013 | Kim .................. G06F 9/3877 713/100 |
| 2016/0016730 A1 | 1/2016 | Supple |
| 2016/0379686 A1 | 12/2016 | Burger et al. |
| 2018/0059939 A1* | 3/2018 | He .................. G06F 12/1081 |
| 2020/0050401 A1* | 2/2020 | Gibb .................. G06F 3/0659 |

FOREIGN PATENT DOCUMENTS

| | | |
|---|---|---|
| WO | 2016016730 A1 | 2/2016 |
| WO | 2017092568 A1 | 6/2017 |

OTHER PUBLICATIONS

Mark Russinovich, "Microsoft Build 2017, Inside Microsoft's FPGA-Based Configurable Cloud, B8063," 2017, 41 pages, Microsoft Corporation, downloaded from https://sec.ch9.ms/sessions/c1f9c808-82bc-480a-a930-b340097f6cc1/build/2017/B8063.pptx.

Adrian M. Caulfield et al., "A Cloud-Scale Acceleration Architecture," 2016, 13 pages, Microsoft Corporation, IEEE, downloaded from http://ieeexplore.ieee.org/stamp/stamp.jsp?tp=&arnumber=7783710.

F. Silla, "Improving the Efficiency of your GPU-accelerated Cluster with rCUDA," 2012, 23 pages, Technical University of Valencia, Spain, downloaded from http://www.rcuda.net/pub/SC12_SLC.pdf.

International Search Report and Written Opinion for International Application No. PCT/SE2018/050477, dated Feb. 14, 2019, 11 pages.

Sang-Woo Jun et al., "In-Storage Embedded Accelerator for Sparse Pattern Processing," 2016, 8 pages, 2016 IEEE High Performance Extreme Computing Conference.

* cited by examiner

METHOD AND NODE FOR MANAGING A REQUEST FOR HARDWARE ACCELERATION BY MEANS OF AN ACCELERATOR DEVICE

CROSS-REFERENCE TO RELATED APPLICATIONS

This application is a National stage of International Application No. PCT/SE2018/050477, filed May 8, 2018, which is hereby incorporated by reference.

TECHNICAL FIELD

Embodiments herein relate to computer systems, such as networks of computer resources, cloud systems or the like. In particular, a method and a hardware acceleration managing node for managing a request for hardware acceleration by means of at least one accelerator device managed by the hardware acceleration managing node are disclosed. A corresponding computer program and a computer program carrier are also disclosed.

BACKGROUND

Hardware acceleration is known for decades, e.g. with the emergence of Graphics Processing Units (GPUs). The GPUs are useful in speeding up specialized tasks, such as image processing for still pictures and/or video.

Furthermore, more general GPUs that assist Central Processing Units (CPUs) to deal more efficiently with heavy computational workloads, including video processing, but also other processing related to e.g. big data analysis, have been introduced.

As a next step in the development of hardware acceleration, Field Programmable Gate Arrays (FPGAs) have been introduced. The FPGAs attract a lot of interest e.g. due to their energy efficient way of accelerating computing tasks. The FPGAs are configurable, by means of software, such as to adapt the hardware of the FPGA to different computing tasks.

In recent years, the term of "hardware accelerator" or "hardware acceleration device" has been used to refer to any hardware acceleration providing entity, such as GPUs, FPGAs and the like. A hardware acceleration device can, similarly to the initially introduced GPUs, be used as a co-processor, as a complete replacement to the CPU processor, or as an Instruction Set Architecture (ISA) extension in one or more CPUs.

In the last couple of years, several reconfigurable architectures have been proposed for the acceleration of cloud computing applications in data centers using FPGAs, and the interest is ramping up.

Lately, there has been a lot of effort in trying to enable the remote use of acceleration devices, sometimes referred as Acceleration-as-a-Service (AaaS). Some of the available solutions for enabling flexible and reconfigurable use of acceleration devices are Disaggregated FPGAs see as of April 2018 for example: JAGATH WEERASINGHE et al., "Disaggregated FPGAs: Network Performance Comparison against Bare-Metal Servers, Virtual Machines and Linux Containers," 2016, pp. 9-17, 2016 IEEE 8th International Conference on Cloud Computing Technology and Science, available from http://ieeexplore.ieee.org/document/7830659/, MARK RUSSINOVICH, "Microsoft Build 2017, Inside Microsoft's FPGA-Based Configurable Cloud, B8063," 2017, 41 pages, Microsoft Corporation, available from https://sec.ch9.ms/sessions/c1f9c808-82bc-480a-a930-b340097f6cc1/build/2017/B8063.pptx, and ADRIAN M. CAULFIELD et al., "A Cloud-Scale Acceleration Architecture," 2016, 13 pages, Microsoft Corporation, IEEE, available from http://ieeexplore.ieee.org/stamp/stamp.jsp?tp=&arnumber=7783710, as wells as Remote Compute Unified Device Architecture (rCUDA), see for example, F. SILLA, "Improving the Efficiency of your GPU-accelerated Cluster with rCUDA," 2012, 23 pages, Technical University of Valencia, Spain, available from http://www.rcuda.net/pub/SC12SLC.pdf, where CUDA is an Application Programming Interface (API) which applications may call to make use of acceleration.

These solutions for the use of remote acceleration devices enable a traditional compute unit to remotely access one or more acceleration devices.

In a further example, U.S. Pat. No. 8,250,578 discloses how to pipeline hardware accelerators of a computing system. Hardware addresses are associated to at least one processing unit (PU) or at least one logical partition (LPAR) of the computing system. A work request for an associated hardware accelerator address is received. Then, the work request for a hardware accelerator using the associated hardware accelerator address is queued.

SUMMARY

In view of the above, it is noted that existing solutions for use of one or more remote acceleration devices enables a compute device to remotely access the acceleration device. A disadvantage of these existing solutions is that, in order to use the acceleration device(s), the compute unit is required to be pre-configured, i.e. have correct driver configurations, pre-allocation of these devices, addressing etc. that statically associate the compute unit with one or more specific remote acceleration devices.

An object may thus be to enable access to a remote acceleration device in a more flexible manner.

According to an aspect, the object is achieved by a method, performed by a hardware acceleration managing node, for managing a request for hardware acceleration "HA" by means of at least one hardware acceleration device within a multiple of hardware acceleration devices managed by the hardware acceleration managing node.

The hardware acceleration managing node receives, from a HA interfacing node, the request for hardware acceleration of processing of source data. The source data is managed by an application, which called the HA interfacing node to initiate the hardware acceleration of the processing of the source data. The hardware acceleration managing node sends, to the HA interfacing node, an indication of a source memory location for storing of the source data.

Furthermore, the hardware acceleration managing node selects at least one hardware acceleration device out of the multiple hardware acceleration devices. The hardware acceleration managing node receives, from the HA interfacing node, a chunk of code to be accelerated.

The hardware acceleration managing node sends, to said one hardware acceleration device, a set of acceleration instructions related to the chunk of code and the indication of the source memory location. The hardware acceleration managing node receives, from said hardware acceleration device, an indication of a result memory location indicating result data, resulting from the processing of the source data.

Then, the hardware acceleration managing node sends an indication of completed hardware acceleration to the HA interfacing node.

According to another aspect, the object is achieved by a hardware acceleration managing node configured for managing a request for hardware acceleration "HA" by means of at least one hardware acceleration device within a multiple of hardware acceleration devices managed by the hardware acceleration managing node.

The hardware acceleration managing node is configured for receiving, from a HA interfacing node, the request for hardware acceleration of processing of source data. The source data is managed by an application, which called the HA interfacing node to initiate the hardware acceleration of the processing of the source data.

Furthermore, the hardware acceleration managing node is configured for sending, to the HA interfacing node, an indication of a source memory location for storing of the source data. The hardware acceleration managing node is configured for selecting at least one hardware acceleration device out of the multiple hardware acceleration devices. The hardware acceleration managing node is configured for receiving, from the HA interfacing node, a chunk of code to be accelerated. The hardware acceleration managing node is configured for sending, to said one hardware acceleration device, a set of acceleration instructions related to the chunk of code and the indication of the source memory location.

Moreover, the hardware acceleration managing node is configured for receiving, from said hardware acceleration device, an indication of a result memory location indicating result data, resulting from the processing of the source data. The hardware acceleration managing node is configured for sending an indication of completed hardware acceleration to the HA interfacing node.

According to further aspects, the object is achieved by a computer program and a computer program carrier corresponding to the aspects above.

The hardware acceleration managing node may be said to operate as a proxy function. This may mean that the hardware acceleration managing node mediates the request from the HA interfacing node towards said at least one selected hardware acceleration device, whereby the hardware acceleration managing node enables the HA interfacing node to dynamically and transparently access the selected hardware acceleration device(s). Accordingly, the HA interfacing node requests acceleration without being aware of which hardware acceleration device(s) will perform the acceleration.

This is in contrast to the existing solutions which statically links the HA interfacing node to an appropriate hardware acceleration device, whereby an entity requesting acceleration directly requests acceleration to be performed by the statically linked appropriate hardware acceleration device, e.g. by means of an address to the appropriate hardware acceleration device.

As a result, the embodiments herein enables the HA interfacing node to flexibly access the hardware acceleration device via the hardware acceleration managing node.

An advantage is thus that the multiple hardware acceleration devices may be shared among a plurality of HA interfacing nodes, e.g. applications, servers, operating systems and the like. This advantage is achieved while it is completely transparent to the application/compute unit which specific hardware acceleration device is used for providing the acceleration.

BRIEF DESCRIPTION OF THE DRAWINGS

The various aspects of embodiments disclosed herein, including particular features and advantages thereof, will be readily understood from the following detailed description and the accompanying drawings, which are briefly described in the following.

DETAILED DESCRIPTION

Figure 1:
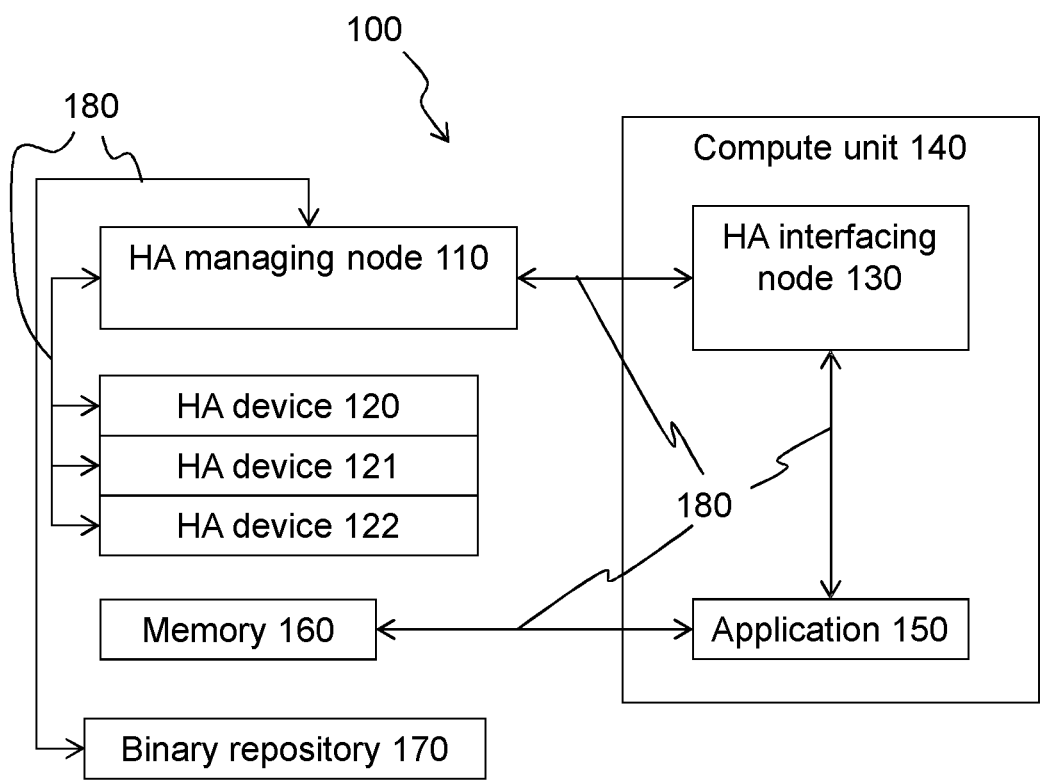
FIG. 1 is a schematic overview of an exemplifying system in which embodiments herein may be implemented.

Throughout the following description, similar reference numerals have been used to denote similar features, such as nodes, actions, modules, circuits, parts, items, elements, units or the like, when applicable. In the Figures, features that appear in some embodiments are indicated by dashed lines.

FIG. 1 depicts an exemplifying hardware system 100 in which embodiments herein may be implemented. The hardware system 100 may be a so called disaggregated hardware system, a cloud system, a data center, a network of computers or the like.

The hardware system 100 may comprise a Hardware Acceleration (HA) managing node 110. The HA managing node 110 may be configured, statically or dynamically, to manage one or more Hardware Acceleration devices (HA devices) 120-122, such as GPUs, FPGAs, accelerator devices or the like. As mentioned previously, an accelerator device may be exemplified by one or more ISA extensions performed on one or more CPUs. Further realisations of an accelerator device are known in the art.

The HA managing node 110 may act as an interface towards a HA interfacing node 130 of a compute unit 140. The HA interfacing node 130 may handle communication between an application 150, executing on the compute unit 140, and the HA managing node 110. The HA interfacing node 130 may be a so called emulator, emulating a physical hardware accelerator device or the HA interfacing node 130 may include a so called accelerator library including the features of the embodiments herein.

Generally, the hardware system 100 may rely on a principle of hardware resource disaggregation. The principle of hardware disaggregation considers Central Processing Unit (CPU), memory and network resources as individual and modular components. The resources are often organized in pools, such as blades, sleds etc. That is, there is a pool of CPU units and a pool of memory units. The resources may comprise many other different kinds of pools, such as storage pools, pools of network interfaces, etc., but throughout this disclosure pools of CPUs and memory units are discussed for reasons of relevance. The terms "CPU pool", "memory pool" etc. will be used herein to refer to a pool of CPUs and a pool of memory units. When utilizing the hardware system, a host machine may be composed of a sub-set of units/resources within one or more pools. A host machine may be assembled by selecting a sub-set of resources within one or more pools. Each host machine typically includes at least one compute unit 140. In this manner, a number of resources is allocated to the host machine. In related literature, the host machine may be referred to by the terms "logical hardware machine", "virtual hardware machine" and the like.

Furthermore, the system 100 comprises a memory 160, which may be accessible by the HA device 120-122 as well as the application 150 and/or compute unit 140. The memory 160 may be any kind of data storage media, such as a hard drive (HDD), a solid state drive, a volatile or non-volatile memory unit, Random Access Memory (RAM), etc. The memory 160 may be used for storing information to be processed by one or more HA devices 120-122 and/or for storing information resulting from processing by one or more HA devices 120-122.

In addition, the system 100 may comprise a binary repository 170, such as a database or the like. The binary repository 170 may include one or more different representations of a procedure that is desired to be accelerated. In this manner, the procedure to be accelerated may be executed on a number of different types of accelerator devices, which may require different formats for execution. E.g. a code in Open Computing Language (OpenCL) may be compiled to be adapted to different types of accelerator devices. The application 150 may provide the different representations to the binary repository 170.

The entities of FIG. 1 may communicate 180, e.g. via Application Programming Interfaces (APIs), with each other at least as is shown in FIG. 1.

Figure 2:
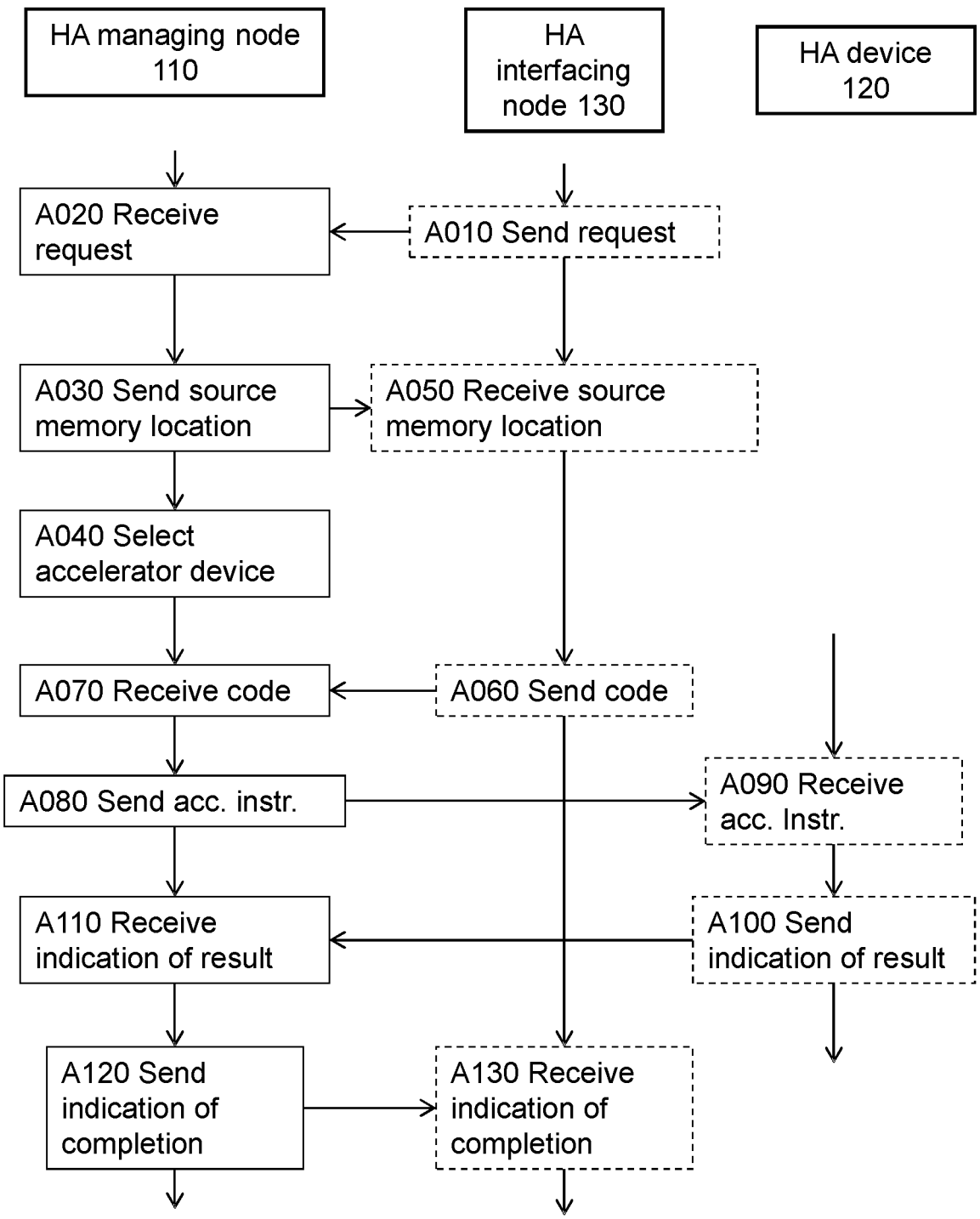
FIG. 2 is a combined signalling and flowchart illustrating the methods herein.

Now that the entities shown in FIG. 1 have been described, an exemplifying overview the flow according to FIG. 2 is provided. The HA managing node 110 may be responsible for assigning memory regions to applications upon their request, using e.g. cudaMalloc( ). Moreover, the HA managing node 110 may receive from the application 150 triggers to run acceleration tasks. In this trigger, the application 150 may also tell the HA managing node 110 who will consume the result of the job, e.g. it can be the application 150 itself who triggered the start of the job, or it can be another application (not shown). Furthermore, the HA managing node may select and load the corresponding code binary from the binary repository to the device if needed or forward the instructions from the compute unit 140 and trigger the start of a job. The HA managing node 110 may also notify the application 150 (or said another application) that will consume the result of the accelerated job about the end of the job, and refer to a memory range where the result data is stored.

FIG. 2 illustrates an exemplifying method according to embodiments herein when implemented in the system 100 of FIG. 1.

The HA managing node 110 performs a method for managing a request for hardware acceleration by means of at least one HA device 120, 121, 122 within a multiple of hardware acceleration devices 120-122 managed by the HA managing node 110. The disaggregated hardware system 100 may comprise multiple HA devices 120-122.

One or more of the following actions may be performed in any suitable order.
Action A010

Initially, the application 150 may call the HA interfacing node 130 in order to obtain acceleration of a chunk of code for processing of source data. The call may be exemplified by that the application 150 sends one or more instructions or the like to the HA interfacing node 130. This is, however, performed according to known manners, while e.g. utilizing commands like cudaMalloc, etc. which are known from the CUDA API, mentioned in the background section.

In some examples, the application 150 may further specify a result memory location at which a result of the processing of the source data is to be stored. This may mean that the instructions may further specify the result memory location. The result memory location may point to one or more locations within the memory 160.

In response to the call from the application 150, the HA interfacing node 130 sends, to the hardware acceleration managing node 110, a request for hardware acceleration of the processing of the source data.

As mentioned above, the result memory location may be specified by the application 150. Thus, the request, sent to the HA managing node 110, may comprise the indication of the result memory location. In this manner, the request may provide information about a consumer of the result, e.g. in terms of an identity of the consumer, the result memory location from which the consumer may retrieve the result or the like.
Action A020

Subsequent to action A010, the HA managing node 110 receives, from the HA interfacing node 130, the request for hardware acceleration of the processing of the source data. The source data is managed by an application, which called the HA interfacing node 130 to initiate the hardware acceleration of the processing of the source data.
Action A030

In order to make the HA interfacing node 130 aware of where to store the source data to be processing by an HA device to be selected in action A040 below, the HA managing node 110 sends, to the HA interfacing node 130, an indication of a source memory location for storing of the source data. The source memory location may point to one or more locations within the memory 160.

Sometimes, e.g. when no consumer has been specified, the result memory location may be derived, e.g. by the HA managing node 110, from the source memory location. As an example, the result memory location may be the same as the source memory location, directly subsequent to the source memory location or the like as found appropriate for any particular use case. In further examples, the HA managing node 110 determines the result memory location, e.g. without consideration of the source memory location. Typically, the HA managing node 110 finds an available memory area and determines that e.g. the beginning of the found memory area is the result memory location.

When the consumer has been specified, it may be that the application 150 and/or the HA interfacing node 130 has derived the result memory location from the source memory location in a similar manner as mentioned directly above.
Action A040

Since the HA managing node 110 has received the request in action A020, the HA managing node 110 selects at least one HA device 120, 121, 122 out of the multiple HA devices 120-122. In this manner, the HA managing node 110 may pick at least one available HA device out the multiple HA devices 120-122. In this context, available may refer to that the selected HA device 120, 121, 122 is current not assigned a task to perform acceleration.
Action A050

Subsequent to action A030, the HA interfacing node 130 may receive the indication of the source memory location. Upon receiving the indication of the source memory location, the HA interfacing node 130 may inform the application 150 of the source memory location. In response thereto, the application 150 may store the source data at the source memory location indicated by the indication of the source memory location. As an example, the application 150 may use cudaMemcpy ( ) known from the CUDA API.

The indication of the source memory location may be a physical or a virtual address.
Action A060

In action A050, the application 150 was informed about the source memory location. In order to execute the chunk of code to be accelerated, the application 150 may provide the chunk of code to the HA interfacing node 130.

In response thereto, the HA interfacing node 130 may send the chunk of code to the HA managing node 110.

Furthermore, it may be that the chunk of code is accompanied by some metadata, such as:

binary_type=OpenCL, Open Accelerators (openACC), CUDA, invocation=Sync or Async

Priority=High, Medium . . .

Version=<version of the func>, or the like.

The binary_type may specify the format of the binary, which may be OpenCL, openACC, CUDA or the like.

The invocation may specify whether the acceleration is invoked synchronously or asynchronously, where synchronous and asynchronous have their conventional meaning within the field of computer programming, i.e. synchronous means that processing by the compute unit may wait for the acceleration of the code to complete before continuing with execution of other code and asynchronous execution allows for processing of other code while the acceleration executes.

The priority may be used by the HA managing node 110 to prioritize among different chunk of codes.

The version may be a number indicating a version of the chunk of code in order for the HA managing node 110 to e.g. find a suitable binary from the binary repository 170.

Action A070

Subsequent to action A060, the HA managing node 110 receives, from the HA interfacing node 130, a chunk of code to be accelerated.

The chunk of code may be an intermediate or final representation of the code. As an example, the HA device 120, 121, 122 may directly use the chunk of code when the chunk of code is a final representation. As an alternative example, the HA device 120, 121, 122 may be required to transform, such as translate, compile, recompile or the like, the chunk of code to be able to turn it into a format that is executable by the HA device 120, 121, 122.

In some examples, the chunk of code may be a request for one of the functions, stored in the binary repository 170. In view of the description of the binary repository 170 in connection with FIG. 1, it may be noted that the chunk of code may represent the procedure for which acceleration is desired.

Action A080

The HA managing node 110 sends, to said one HA device 120, 121, 122, a set of acceleration instructions related to the chunk of code and the indication of the source memory location(s).

In this manner, the HA managing node 110 may enable processing, by said one HA device 120, 121, 122, of the source data, stored at the source memory location, according to the set of acceleration instructions.

In some cases, the set of acceleration instructions may comprise the chunk of code, i.e. no translation or compilation is required in order to enable execution, by said one HA device 120, 121, 122, of the chunk of code. In some examples, the set of acceleration instruction may thus be the chunk of code. In such examples, the terms "set of acceleration instructions" and "chunk of code" may be interchangeable.

Action A090

Subsequent to action A080, the HA device 120 may receive the set of acceleration instructions, or "acc. instr." for short as in the Figure.

The set of acceleration instructions may be accompanied by the indication of the source memory location(s). This may mean that the HA managing node 110 may send, to the selected HA device 120, 121, 122 the indication of the source memory location. As a result, the HA device 120 is made aware of both the chunk of code to be executed and which source data to process while executing the chunk of code.

At this stage, the HA device 120 may process the source data by execution of the set of acceleration instructions. When completed, action A100 as below is performed.

Action A100

Hence, when the HA device 120 has finished the processing of the source data by execution of the set of acceleration instruction, the HA device 120 may send an indication of a result memory location(s) indicating result data. The result data thus results from said processing of the source data.

Action A110

Subsequent to action A100, the HA managing node 110 receives, from said HA device 120, 121, 122, the indication of the result memory location. The indication of the result memory location may be a physical or virtual memory address.

Action A120

In order to make the HA interfacing node 130, and possibly also the application 150, aware of that the processing of the source data is completed, the HA managing node 110 sends an indication of completed hardware acceleration to the HA interfacing node 130.

In some examples, the indication of completed hardware acceleration may be included a message.

When the result memory location has been determined, or derived, by the HA managing node 110, the message may further include the indication of the result memory location. The indication of the result memory location may also be sent separately from the indication of the completed hardware acceleration. In this manner, the HA interfacing node 130 may be made aware of where to find the result of the processing. Ultimately, the application 150 may also be informed by the HA interfacing node 130 of the result memory location.

In this manner, the HA managing node 110 enables remote hardware acceleration as a service, i.e. AaaS, in a truly transparent manner to the application 150 and/or the compute unit 140. In other words, there is no "hard-wiring" between the application 150 requesting acceleration and the HA devices 120-122.

From a perspective of the application 150, the application 150 may interact with the HA interfacing node 130 while being unaware of that the HA interfacing node achieves the acceleration by use of the HA managing node 110 providing AaaS. This means that the compute unit 140 and/or application 150 is/are not aware of which specific HA device 120, 121, 122 is providing the acceleration.

Furthermore, the HA managing node 110 may enable more efficient resource utilization, e.g. since HA devices 120-122 may be shared among many applications applications/servers/operating systems.

U.S. Pat. No. 8,250,578, as mentioned in the background section, directly assigns a processor to a specific accelerator device within an accelerator farm by means of a physical address of the specific accelerator device. The processor thus directly communicates with the assigned accelerator. When a particular accelerator is occupied, the processor attempting to access it, it will be put in a queue.

Figure 3:
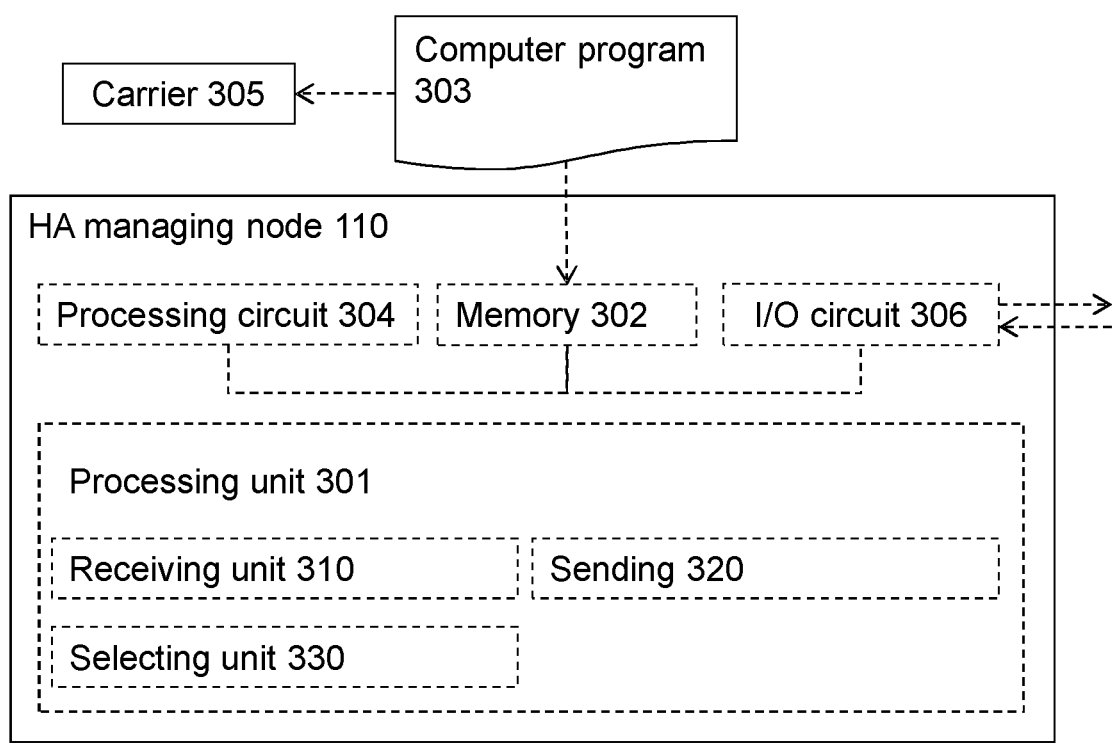
FIG. 3 is a block diagram illustrating embodiments of the hardware acceleration managing node.

With reference to FIG. 3, a schematic block diagram of embodiments of the HA managing node 110 of FIG. 1 is shown.

The HA managing node 110 may comprise a processing unit 301, such as a means for performing the methods described herein. The means may be embodied in the form of one or more hardware units and/or one or more software units. The term "unit" may thus refer to a circuit, a software block or the like according to various embodiments as described below.

The HA managing node 110 may further comprise a memory 302. The memory may comprise, such as contain or store, instructions, e.g. in the form of a computer program 303, which may comprise computer readable code units.

According to some embodiments herein, the HA managing node 110 and/or the processing unit 301 comprises a processing circuit 304 as an exemplifying hardware unit, which may comprise one or more processors. Accordingly, the processing unit 301 may be embodied in the form of, or 'realized by', the processing circuit 304. The instructions may be executable by the processing circuit 304, whereby the HA managing node 110 is operative to perform the methods of FIG. 2. As another example, the instructions, when executed by the HA managing node 110 and/or the processing circuit 304, may cause the HA managing node 110 to perform the method according to FIG. 2.

In view of the above, in one example, there may be provided a HA managing node 110 configured for managing a request for hardware acceleration by means of at least one HA device 120, 121, 122 within a multiple of hardware acceleration devices 120-122 managed by the HA managing node 110. As mentioned, the disaggregated hardware system 100 may comprise multiple HA devices 120-122. Again, the memory 302 contains the instructions executable by said processing circuit 304, whereby the HA managing node 110 is operative for:

receiving, from a HA interfacing node 130, the request for hardware acceleration of processing of source data, wherein the source data is managed by an application, which called the HA interfacing node 130 to initiate the hardware acceleration of the processing of the source data, sending, to the HA interfacing node 130, an indication of a source memory location for storing of the source data, selecting one HA device 120, 121, 122 out of the multiple HA devices 120-122, receiving, from the HA interfacing node 130, a chunk of code to be accelerated, sending, to said one HA device 120, 121, 122, a set of acceleration instructions related to the chunk of code and the indication of the source memory location, receiving, from said HA device 120, 121, 122, an indication of a result memory location indicating result data, resulting from the processing of the source data, and sending an indication of completed hardware acceleration to the HA interfacing node 130.

FIG. 3 further illustrates a carrier 305, or program carrier, which provides, such as comprises, mediates, supplies and the like, the computer program 303 as described directly above. The carrier 305 may be one of an electronic signal, an optical signal, a radio signal and a computer readable medium.

In some embodiments, the HA managing node 110 and/or the processing unit 301 may comprise one or more of a receiving unit 310, a sending unit 320, and a selecting unit 330 as exemplifying hardware units. The term "unit" may refer to a circuit when the term "unit" refers to a hardware unit. In other examples, one or more of the aforementioned exemplifying hardware units may be implemented as one or more software units.

Moreover, the HA managing node 110 and/or the processing unit 301 may comprise an Input/Output (I/O) circuit 306, which may be exemplified by the receiving unit and/or the sending unit when applicable.

Accordingly, the HA managing node 110 is configured for managing a request for hardware acceleration "HA" by means of at least one HA device 120, 121, 122 within a multiple of hardware acceleration devices 120-122 managed by the HA managing node 110. A disaggregated hardware system 100 may comprise multiple HA devices 120-122.

Therefore, according to the various embodiments described above, the HA managing node 110 and/or the processing circuit 304 and/or the processing unit 301 and/or the receiving unit 310 is configured for receiving, from a HA interfacing node 130, the request for hardware acceleration of processing of source data. The source data is managed by an application, which called the HA interfacing node 130 to initiate the hardware acceleration of the processing of the source data. The request may comprise the indication of the result memory location. The result memory location may be derived from the source memory location.

The HA managing node 110 and/or the processing circuit 304 and/or the processing unit 301 and/or the sending unit 320 is configured for sending, to the HA interfacing node 130, an indication of a source memory location for storing of the source data.

The HA managing node 110 and/or the processing circuit 304 and/or the processing unit 301 and/or the selecting unit 330 is configured for selecting at least one HA device 120, 121, 122 out of the multiple HA devices 120-122.

The HA managing node 110 and/or the processing circuit 304 and/or the processing unit 301 and/or the receiving unit 310 is configured for receiving, from the HA interfacing node 130, a chunk of code to be accelerated.

The HA managing node 110 and/or the processing circuit 304 and/or the processing unit 301 and/or the sending unit 320 is configured for sending, to said one HA device 120, 121, 122, a set of acceleration instructions related to the chunk of code and the indication of the source memory location.

The HA managing node 110 and/or the processing circuit 304 and/or the processing unit 301 and/or the receiving unit 310 is configured for receiving, from said HA device 120, 121, 122, an indication of a result memory location indicating result data, resulting from the processing of the source data.

The HA managing node 110 and/or the processing circuit 304 and/or the processing unit 301 and/or the sending unit 320 is configured for sending an indication of completed hardware acceleration to the HA interfacing node 130.

As used herein, the term "node", or "network node", may refer to one or more physical entities, such as devices, apparatuses, computers, servers or the like. This may mean that embodiments herein may be implemented in one physical entity. Alternatively, the embodiments herein may be implemented in a plurality of physical entities, such as an arrangement comprising said one or more physical entities, i.e. the embodiments may be implemented in a distributed manner, such as on cloud system, which may comprise a set of server machines. In case of a cloud system, the term "node" may refer to a virtual machine, such as a container, virtual runtime environment or the like. The virtual machine may be assembled from hardware resources, such as memory, processing, network and storage resources, which may reside in different physical machines, e.g. in different computers.

As used herein, the term "unit" may refer to one or more functional units, each of which may be implemented as one or more hardware units and/or one or more software units and/or a combined software/hardware unit in a node. In some examples, the unit may represent a functional unit realized as software and/or hardware of the node.

As used herein, the term "computer program carrier", "program carrier", or "carrier", may refer to one of an electronic signal, an optical signal, a radio signal, and a computer readable medium. In some examples, the computer program carrier may exclude transitory, propagating signals, such as the electronic, optical and/or radio signal. Thus, in these examples, the computer program carrier may be a non-transitory carrier, such as a non-transitory computer readable medium.

As used herein, the term "processing unit" may include one or more hardware units, one or more software units or a combination thereof. Any such unit, be it a hardware, software or a combined hardware-software unit, may be a determining means, estimating means, capturing means, associating means, comparing means, identification means, selecting means, receiving means, sending means or the like as disclosed herein. As an example, the expression "means" may be a unit corresponding to the units listed above in conjunction with the Figures.

As used herein, the term "software unit" may refer to a software application, a Dynamic Link Library (DLL), a software component, a software object, an object according to Component Object Model (COM), a software function, a software engine, an executable binary software file or the like.

The terms "processing unit" or "processing circuit" may herein encompass a processing unit, comprising e.g. one or more processors, an Application Specific Integrated Circuit (ASIC), a Field-Programmable Gate Array (FPGA) or the like. The processing circuit or the like may comprise one or more processor kernels.

As used herein, the expression "configured to/for" may mean that a processing circuit is configured to, such as adapted to or operative to, by means of software configuration and/or hardware configuration, perform one or more of the actions described herein.

As used herein, the term "action" may refer to an action, a step, an operation, a response, a reaction, an activity or the like. It shall be noted that an action herein may be split into two or more sub-actions as applicable. Moreover, also as applicable, it shall be noted that two or more of the actions described herein may be merged into a single action.

As used herein, the term "memory" may refer to a hard disk, a magnetic storage medium, a portable computer diskette or disc, flash memory, random access memory (RAM) or the like. Furthermore, the term "memory" may refer to an internal register memory of a processor or the like.

As used herein, the term "computer readable medium" may be a Universal Serial Bus (USB) memory, a Digital Versatile Disc (DVD), a Blu-ray disc, a software unit that is received as a stream of data, a Flash memory, a hard drive, a memory card, such as a MemoryStick, a Multimedia Card (MMC), Secure Digital (SD) card, etc. One or more of the aforementioned examples of computer readable medium may be provided as one or more computer program products.

As used herein, the term "computer readable code units" may be text of a computer program, parts of or an entire binary file representing a computer program in a compiled format or anything there between.

As used herein, the expression "transmit" and "send" are considered to be interchangeable. These expressions include transmission by broadcasting, uni-casting, group-casting and the like. In this context, a transmission by broadcasting may be received and decoded by any authorized device within range. In case of uni-casting, one specifically addressed device may receive and decode the transmission. In case of group-casting, a group of specifically addressed devices may receive and decode the transmission.

As used herein, the terms "number" and/or "value" may be any kind of digit, such as binary, real, imaginary or rational number or the like. Moreover, "number" and/or "value" may be one or more characters, such as a letter or a string of letters. "Number" and/or "value" may also be represented by a string of bits, i.e. zeros and/or ones.

As used herein, the terms "first", "second", "third" etc. may have been used merely to distinguish features, apparatuses, elements, units, or the like from one another unless otherwise evident from the context.

As used herein, the term "subsequent action" may refer to that one action is performed after a preceding action, while additional actions may or may not be performed before said one action, but after the preceding action.

As used herein, the term "set of" may refer to one or more of something. E.g. a set of devices may refer to one or more devices, a set of parameters may refer to one or more parameters or the like according to the embodiments herein.

As used herein, the expression "in some embodiments" has been used to indicate that the features of the embodiment described may be combined with any other embodiment disclosed herein.

Even though embodiments of the various aspects have been described, many different alterations, modifications and the like thereof will become apparent for those skilled in the art. The described embodiments are therefore not intended to limit the scope of the present disclosure.

The invention claimed is:

1. A method, performed by a hardware acceleration managing node, for managing a request for hardware acceleration (HA) by means of at least one hardware acceleration device within a multiple of hardware acceleration devices managed by the hardware acceleration managing node, the method comprising:
receiving, from a HA interfacing node, the request for hardware acceleration of processing of source data, wherein the source data is managed by an application, which called the HA interfacing node to initiate the hardware acceleration of the processing of the source data;
sending, to the HA interfacing node, an indication of a source memory location for storing of the source data;
selecting at least one hardware acceleration device out of the multiple hardware acceleration devices;
receiving, from the HA interfacing node, a chunk of code to be accelerated;
sending, to said at least one hardware acceleration device, a set of acceleration instructions related to the chunk of code and the indication of the source memory location;
receiving, from said at least one hardware acceleration device, an indication of a result memory location indicating result data, resulting from the processing of the source data; and
sending an indication of completed hardware acceleration to the HA interfacing node.

2. The method according to claim 1, wherein the request comprises the indication of the result memory location.

3. The method according to claim 1, wherein the result memory location is derived from the source memory location.

4. A hardware acceleration managing node configured for managing a request for hardware acceleration (HA) by means of at least one hardware acceleration device within a multiple of hardware acceleration devices managed by the hardware acceleration managing node, wherein the hardware acceleration managing node comprising:

a processing circuit; and a memory comprising instructions which, when executed by the processing circuit, cause the hardware acceleration managing node to:

receive, from a HA interfacing node, the request for hardware acceleration of processing of source data, wherein the source data is managed by an application, which called the HA interfacing node to initiate the hardware acceleration of the processing of the source data;

send, to the HA interfacing node, an indication of a source memory location for storing of the source data;

select at least one hardware acceleration device out of the multiple hardware acceleration devices;

receive, from the HA interfacing node, a chunk of code to be accelerated;

send, to said at least one hardware acceleration device, a set of acceleration instructions related to the chunk of code and the indication of the source memory location;

receive, from said at least one hardware acceleration device, an indication of a result memory location indicating result data, resulting from the processing of the source data; and send an indication of completed hardware acceleration to the HA interfacing node.

5. The hardware acceleration managing node according to claim 4, wherein the request comprises the indication of the result memory location.

6. The hardware acceleration managing node according to claim 4, wherein the result memory location is derived from the source memory location.

7. A non-transitory computer-readable storage medium comprising computer readable code which, when executed on at least one processor, are capable of causing a hardware acceleration managing node, for managing a request for hardware acceleration (HA) by means of at least one hardware acceleration device within a multiple of hardware acceleration devices managed by the hardware acceleration managing node, to perform operations comprising:

receiving, from a HA interfacing node, the request for hardware acceleration of processing of source data, wherein the source data is managed by an application, which called the HA interfacing node to initiate the hardware acceleration of the processing of the source data;

sending, to the HA interfacing node, an indication of a source memory location for storing of the source data;

selecting at least one hardware acceleration device out of the multiple hardware acceleration devices;

receiving, from the HA interfacing node, a chunk of code to be accelerated;

sending, to said at least one hardware acceleration device, a set of acceleration instructions related to the chunk of code and the indication of the source memory location;

receiving, from said at least one hardware acceleration device, an indication of a result memory location indicating result data, resulting from the processing of the source data; and sending an indication of completed hardware acceleration to the HA interfacing node.

8. The non-transitory computer-readable storage medium according to claim 7, wherein the request comprises the indication of the result memory location.

9. The non-transitory computer-readable storage medium according to claim 7, wherein the result memory location is derived from the source memory location.

* * * * *